United States Patent
Amthor et al.

(10) Patent No.: US 12,332,420 B2
(45) Date of Patent: Jun. 17, 2025

(54) MICROSCOPY SYSTEM AND METHOD FOR ANALYZING AN OVERVIEW IMAGE

(71) Applicant: Carl Zeiss Microscopy GmbH, Jena (DE)

(72) Inventors: Manuel Amthor, Jena (DE); Daniel Haase, Zöllnitz (DE); Thomas Ohrt, Golmsdorf (DE)

(73) Assignee: Carl Zeiss Microscopy GmbH, Jena (DE)

( * ) Notice: Subject to any disclaimer, the term of this patent is extended or adjusted under 35 U.S.C. 154(b) by 549 days.

(21) Appl. No.: 17/493,957

(22) Filed: Oct. 5, 2021

(65) Prior Publication Data
US 2022/0113533 A1 Apr. 14, 2022

(30) Foreign Application Priority Data
Oct. 9, 2020 (DE) ..................... 10 2020 126 522.0

(51) Int. Cl.
| | |
|---|---|
| *G02B 21/36* | (2006.01) |
| *G02B 21/26* | (2006.01) |
| *G02B 21/33* | (2006.01) |

(52) U.S. Cl.
CPC ........... *G02B 21/367* (2013.01); *G02B 21/26* (2013.01); *G02B 21/33* (2013.01); *G02B 21/361* (2013.01); *G06T 2207/10056* (2013.01)

(58) Field of Classification Search
CPC ...... G02B 21/367; G02B 21/26; G02B 21/33; G02B 21/361; G06T 2207/10056
See application file for complete search history.

(56) References Cited

U.S. PATENT DOCUMENTS

| | | | | |
|---|---|---|---|---|
| 987,518 | A * | 3/1911 | Wendling | B67D 7/565 141/96 |
| 11,168,976 | B2 * | 11/2021 | Amthor | G06T 7/60 |
| 11,307,398 | B2 * | 4/2022 | Haase | G02B 21/125 |
| 2005/0090961 | A1 * | 4/2005 | Bonk | B07C 5/38 701/50 |
| 2012/0051660 | A1 * | 3/2012 | Lee | G02B 21/367 345/440 |
| 2014/0210980 | A1 | 7/2014 | Watanabe | |
| 2015/0115174 | A1 * | 4/2015 | Chen | G02B 27/0025 250/216 |
| 2016/0069624 | A1 * | 3/2016 | Rollins | F04D 25/08 417/423.12 |
| 2016/0216503 | A1 * | 7/2016 | Kim | G02B 13/0095 |

(Continued)

FOREIGN PATENT DOCUMENTS

| | | | | |
|---|---|---|---|---|
| CN | | 218545758 U * | 2/2023 | ......... E02D 29/1481 |
| DE | | 102017109698 A1 | 11/2018 | |

(Continued)

*Primary Examiner* — Mohamed K Amara
(74) *Attorney, Agent, or Firm* — LaBatt, LLC

(57) ABSTRACT

A microscopy system comprises a microscope with an overview camera for capturing at least one overview image of a sample carrier designed to receive at least one sample fluid; and a computing device configured to determine at least one sample image area of the at least one sample fluid within the at least one overview image. The computing device comprises an evaluation program into which a determined sample image area is entered and which is configured to determine a fluid state of the associated sample fluid based on the sample image area.

20 Claims, 4 Drawing Sheets

(56) References Cited

U.S. PATENT DOCUMENTS

| | | | | |
|---|---|---|---|---|
| 2017/0307530 A1* | 10/2017 | Mikami | ............. | G01N 33/4833 |
| 2018/0143111 A1* | 5/2018 | Berezhna | ............. | G06V 20/698 |
| 2019/0384962 A1* | 12/2019 | Hayut | ................... | G06T 3/4053 |
| 2020/0057291 A1 | 2/2020 | Haase et al. | | |
| 2020/0088984 A1 | 3/2020 | Haase et al. | | |
| 2020/0200531 A1 | 6/2020 | Amthor et al. | | |
| 2020/0310098 A1* | 10/2020 | Ince | ..................... | G06T 7/0012 |
| 2021/0149169 A1* | 5/2021 | Leshem | ............... | G02B 21/367 |
| 2021/0333537 A1* | 10/2021 | Bayer | ................. | G06V 20/698 |
| 2022/0284574 A1* | 9/2022 | Wagner | ................. | C12M 47/04 |
| 2024/0044098 A1* | 2/2024 | Yuan | ................... | E02D 29/1481 |

FOREIGN PATENT DOCUMENTS

| | | | | |
|---|---|---|---|---|
| DE | 102017111718 A1 | 12/2018 | | |
| DE | 102018133188 A1 | 6/2020 | | |
| EP | 2954274 B1 * | 10/2022 | ........... | F04D 25/028 |

* cited by examiner

MICROSCOPY SYSTEM AND METHOD FOR ANALYZING AN OVERVIEW IMAGE

REFERENCE TO RELATED APPLICATIONS

The current application claims the benefit of German Patent Application No. 10 2020 126 522.0, filed on 9 Oct. 2020, which is hereby incorporated by reference.

FIELD OF THE DISCLOSURE

The present disclosure relates to a microscopy system with which an overview image of a sample carrier is captured and to a method for evaluating an overview image.

BACKGROUND OF THE DISCLOSURE

An application in the field of microscopy is the capture of series of images of dynamic samples, e.g. living cells, microorganisms, organs or organoids. In order to be able to make meaningful statements about such samples, the control and setting of sample environment conditions is crucial. In particular the sample carrier and attributes of the artificially created environment (e.g. the sample medium, buffer conditions, growth factors and temperature fluctuations) can have a significant impact on the sample. A control of a number of parameters, especially regarding the sample medium, is thus desirable.

An impairment of the sample can result from an evaporation of the medium in cases where there is a small quantity of the medium or from the influence of ambient air, e.g., in cases of changes in pH values, temperature fluctuations or surface oscillations. In order to minimize evaporation effects, sample receptacles can be filled to a higher level, which entails a risk of liquid spilling when the sample stage is moved automatically.

In order to facilitate in particular automated analyses, microscopy systems have been developed with which a sample carrier can be detected and sample receptacles localized in an overview image. This enables an automated positioning of the sample stage in order to select sample receptacles for more detailed analyses. A generic microscopy system comprises a microscope with an overview camera for capturing at least one overview image of a sample carrier designed to receive at least one sample fluid; and a computing device configured to determine at least one sample image area of the at least one sample fluid within the at least one overview image. In a generic method for evaluating overview images, at least one overview image of a sample carrier designed to receive at least one sample fluid is received. At least one sample image area of the at least one sample fluid is determined within the at least one overview image. Microscopes with which an overview image is captured and a sample carrier or sample areas are localized in the overview image by means of, e.g., a segmentation have been described by the Applicant, for example, in DE 10 2018 133 188 A1, DE 10 2017 109 698 A1 and DE 10 2017 111 718 A1.

SUMMARY OF THE DISCLOSURE

It can be considered an object of the invention to provide a microscopy system and a method which enable an efficient analysis of one or more samples supported by a sample carrier by means of an evaluation of overview images.

This object is achieved by means of the microscopy system with the features of claim 1 and by means of the method with the features of claim 2.

According to the invention, in the microscopy system of the aforementioned type, the computing device comprises an evaluation program into which a determined sample image area is entered and which is configured to determine a fluid state of the associated sample fluid based on the sample image area.

According to the invention, in the method of the aforementioned type, a determined sample image area is entered into an evaluation program. The evaluation program then respectively determines a fluid state of the associated sample fluid based on the sample image area.

Overview images can thus be used not only for sample localization or documentation purposes, but to gain information regarding the medium in which a sample is located. For example, a rough estimate of the fill levels of all sample receptacles can occur in order to control the positioning speed of a sample stage accordingly. Situations in which a defect affects the fluid in which the sample is located (e.g. changes in the pH value of the fluid or crystallization of the sample in the fluid) can potentially be detected based on overview images alone. This makes an early intervention possible before time-consuming in-depth analyses are carried out unnecessarily.

Optional Embodiments

Advantageous variants of the microscopy system according to the invention and of the method according to the invention are the object of the dependent claims and are explained in the following.

Evaluation of a Plurality of Sample Areas

The sample carrier can comprise a plurality of sample receptacles for receiving a sample fluid. For example, the sample carrier can be a microtiter plate or a chamber slide. The computing device can be configured to determine a plurality of sample image areas, which represent the sample receptacles, within the same overview image. The evaluation program can be configured to determine a fluid state of the associated sample fluid for each of said sample image areas. A fluid state can thus be respectively determined for a plurality of sample receptacles or even all sample receptacles visible in an overview image. It is particularly advantageous in an automated process involving sample carriers with a large number of sample receptacles to be able to detect defective situations from an overview image at an early stage.

In order to make it easier to understand the invention, the sample fluid, the sample image area, the fluid state and the sample receptacle are partially described in the singular in the following. However, notwithstanding the singular form chosen for the purposes of illustration, it is understood that sample fluids can be contained in a plurality of sample receptacles so that the evaluation program respectively infers a fluid state for a plurality of sample image areas. In principle, a collective fluid state can also be determined for a plurality of sample image areas, i.e. for a plurality of sample fluids of different sample receptacles; for example, a collective fluid state can indicate whether or not all fill levels are in a correct range.

Evaluation Program

The evaluation program can comprise a model learned using training data (evaluation model in the following) or can in principle also be constituted by classic algorithms without machine learning models. Features that can be assessed by classic algorithms are described in greater detail later on.

The learned evaluation model can in particular be formed by a supervised or unsupervised learning process. In a supervised learning process, the training data can comprise annotated overview images or annotated sample image areas of overview images. Associated fluid states can be respectively predefined in the form of annotations. In light of the high variability of features and imaging conditions of captured in overview images, a learned model can be less susceptible to errors than a classic image analysis method. It is in particular possible to use deep neural networks, e.g. convolutional neural networks (CNN), which exhibit a high level of robustness and generalizability.

In the case of an unsupervised learning, the evaluation model can be designed for anomaly detection/novelty detection. The evaluation model can infer an anomaly, i.e. an anomalous fluid state, as a function of a similarity of an input sample image area with the training data. For example, the training data can depict solely sample fluids the state of which has been classified as correct by a user. A deviation from such image data can be evaluated as a (potentially) defective fluid state. For example, a depiction of the sample image area can diverge from the training data as the result of a contamination of the sample.

Different fluid states are described in the following. Annotations of the training data can be used that correspond to these fluid states.

Fluid State, in Particular Fill Level, Sample Color or Turbidity

The fluid state generally relates to a feature of the fluid in which the sample is located or a feature of the sample accommodated in the fluid. In particular, the fluid state can indicate a presence, a quantity and/or a contamination of the fluid.

The fluid state can be indicated by a binary value (e.g., yes/no), by an ordinal expression (e.g., small/medium/large quantity) or by a concrete value (e.g., time until evaporation of the fluid).

In particular, the detected fluid state can indicate a fill level of the associated sample fluid. If a learned evaluation model is used, the corresponding training data can show sample receptacles filled to different heights and the respective fill levels can be indicated in the form of annotations. The evaluation model can be a CNN which maps an input image to a fill level by means of regression or to expressions of a fill quantity such as "small/medium/large quantity" or "insufficient/sufficient/excessive quantity" via classification. Alternatively, a fill level can be indicated as an estimated height, e.g., in mm, as an estimated fluid volume, e.g., in $mm^3$, or as a distance to an upper edge of an associated sample receptacle.

The respective fluid state determined for each determined sample image area of a sample receptacle can additionally or alternatively indicate whether the sample receptacle in question is empty or whether it contains fluid. The computing device can optionally be configured to position and analyze, in an automated sample analysis, only those sample receptacles for which it has been determined that they contain a sufficient quantity of fluid. As a result, in the case of screening experiments, only those sample receptacles of a microtiter plate or a chamber slide are analyzed in which experiments are actually being carried out or samples are present, whereby an efficient use of time and data is achieved. More generally, it is possible to determine which sample receptacles are subjected to further analysis as a function of the determined fluid state. For example, a sample stage can be controlled to guide only those sample receptacles into a microscope light path for which the fluid state indicates a state free of defects.

Alternatively or additionally, fluid states can also discriminate between colors, color intensities and/or absorptions or levels of turbidity of the filling. A color intensity, for example, usually depends on the fill level so that the fill level of the associated sample receptacle can be inferred via the color intensity. In the case of colorless fluids, it is also possible to capture a level of turbidity, which can be used as an indicator of a fill level or for determining which sample receptacles should be analyzed further. A deviation of the color or turbidity level from an expected color or turbidity range can indicate a contamination or unintentional modification of the sample fluid.

A prediction of how much time remains until a filling has evaporated or has evaporated to the point where there is no longer a sufficient quantity of fluid can also be output as a fluid state.

Training data of a supervised learning process includes training images comprising the different manifestations of the aforementioned features (e.g. different levels of turbidity) as well as a corresponding annotation (e.g. fill level corresponding to a level of turbidity). It is also possible to capture overview images of sample receptacles with colored fluid, e.g. red fluid, and subsequently convert the same into grayscale images in order to generate training images. The color can be used in the training as a ground-truth annotation for the fill level.

Time Series

Optionally, a plurality of overview images of the same sample carrier or of the same sample receptacles can be captured after time intervals. The at least one sample image area of the at least one sample fluid is respectively determined in these overview images. Tracking can also be used here so that the same sample receptacle can be found again in different overview images even if the sample carrier has been moved.

By means of the evaluation program, a progression of the fill level or of another fluid state can be determined for the same sample area or the same sample receptacle over time. For example, each sample image area of the different overview images can be entered into the evaluation program individually in order to calculate respective fluid states, which, when concatenated, form the progression over time. Alternatively, the sample image areas (or sections of the same) of the various overview images are input into the evaluation program collectively, which determines a progression over time directly therefrom. The evaluation model in this case can be constituted by a CNN with multidimensional input in order to map the sample image areas of the same sample receptacle from successively captured overview images to a fluid state or an evolution of a fluid state. Instead of a CNN, it is also possible to use, e.g., an RNN (recurrent neural network), in particular an LSTM (long short-term memory). Considering a plurality of successively captured image sections together can be advantageous for a precise depiction of a relative color intensity.

It is also possible by means of the evaluation program to calculate a prediction regarding when a fill level will fall below a minimum fill level based on the sample image areas of successively captured overview images. This prediction can be calculated in addition or alternatively to the types of fluid states described above. Corresponding training data can comprise, e.g., overview images or sample image areas thereof that were captured up to a point in time at which evaporation led to a defined minimum fill level. The evaluation program can be designed to output the prediction directly or to output the respective fill levels or a progression of the fill levels over time. The prediction of when a fill level will fall below a minimum fill level can then be calculated based on the progression over time. To this end, for example, the progression over time can be input into a learned model (prediction model) that has learned using training data to calculate a prediction of the point in time at which a fill level will fall below a minimum fill level based on an input progression over time.

Time series can also be applied in the described manner to other types of fluid states for which it is possible to specify a respective upper or lower limit besides fill levels. For example, a time series relating to color changes of pH indicators can be generated in order to predict the point in time at which a particular/unacceptable pH value will be reached.

Overview Images from Different Perspectives

The described variants with one overview image can be modified so that a plurality of overview images of the same sample carrier or of the same sample receptacle or same sample receptacles are captured. While the time series described above are preferably calculated with overview images for which the overview camera is oriented in the same position or with the same angle of view relative to the sample carrier, two or more overview images are captured from different perspectives relative to the sample carrier in the variants described in the following. It is possible to use differently positioned overview cameras to this end, which capture the overview images in particular simultaneously. Alternatively, a plurality of overview images can be captured by the same overview camera, wherein a movement of the sample stage occurs during image capture or between image capture events. A sample image area relating to the same sample fluid or to the same sample receptacle is respectively determined in the plurality of overview images. This plurality of sample image areas relating to the same sample fluid from different overview images is collectively fed to the evaluation program in order to determine the fluid state. The evaluation program is thereby able to exploit, for example, the fact that the sample image areas differ in the various overview images as a function of the fill level. Accordingly, in the training of an evaluation model in this case, a plurality of images from a plurality of perspectives can collectively constitute an input into the evaluation model.

Features/Criteria for Evaluating the Fluid State

Features or criteria that can be taken into account by the evaluation program in order to infer the described fluid states are explained in greater detail in the following. An assessment of sample image areas according to the criteria can be performed by a classic image processing application. Alternatively, the evaluation model can be trained to take these features into account by using training images which differ with respect to these features and which are provided with corresponding annotations of the associated fluid state.

The evaluation program can take into account at least one of the following features for determining the fluid state:
  a color intensity in the sample image area;
  how image content in the sample image area appears distorted or altered in size or position due to a lens effect caused by a surface of the sample liquid;
  whether drops are discernible on a side wall or cover of an associated sample receptacle in the sample image area;
  whether a color or color distribution within the sample image area deviates from an expected sample color or sample color distribution, based on which a contamination of the sample can be inferred.

In order to take into account a lens effect of a surface of the sample liquid, the evaluation program can assess a sample image area on the basis of how a background visible through the sample fluid appears, in particular how distorted or altered in size the background appears and/or how large a sample receptacle visible through the sample fluid appears. The background can be known; for example, the background can be an LED matrix for which the spacing of the LEDs is known. A distortion of the background, which can be caused by a meniscus of the fluid, can thus be detected by an LED spacing that is smaller or larger than expected. According to a further example, although filled wells/sample receptacles may look the same as unfilled wells, they can appear smaller. In particular an edge viewed through the sample liquid can appear smaller. According to a still further example, a specially constructed or textured cover, e.g. with a checkered pattern, is used. The cover can be arranged on a microtiter plate or some other type of sample carrier. In this case, distortions can be detected relatively easily as well as quantified precisely.

It is also possible to detect artefacts caused by the fluid at the capture of the overview image. For example, when a checkered pattern is activated by means of an LED matrix, visible squares can appear in sample image areas of sample receptacles filled with fluid.

A lens effect can be exploited in the evaluation of a single overview image or a plurality of overview images captured in direct succession. For example, it is possible to effect a sample stage movement, in particular a rapid back-and-forth movement, while simultaneously capturing a plurality of overview images. The at least one sample image area is respectively determined in these overview images. The evaluation program takes into account changes in appearance or lens effects in the sample image area brought about by the movement of the sample stage over the plurality of overview images. For example, the movement can lead to a displacement and/or distortion of a background visible through the fluid. The fluid state, in particular a fill level, can be inferred from such a change.

The evaluation program can also take into account a movement of a sample or an inertia of a sample in surrounding fluid in view of a movement of the sample stage. A plurality of overview images are thus assessed according to whether a sample is moving relative to the surrounding fluid in order to determine the fluid state.

The evaluation program can alternatively or additionally be designed to detect crystals in the sample image area and to use this as an indicator of a desiccation of what is otherwise sample fluid. It is possible to differentiate here between the fluid states desiccated sample, non-desiccated sample and optionally empty sample receptacle.

The evaluation program can also assess reflections on a fluid surface in the sample image area in order to determine a fluid state. In this scenario, in particular both a source of illumination and an angle of view of the overview camera can be directed at the sample carrier from above.

Optionally, a plurality of overview images can also be captured with different lighting. The evaluation program assesses a difference between corresponding sample image areas of a plurality of overview images, i.e. a difference between sample image areas that depict the same sample receptacle in the different overview images. The fluid state can in turn be determined from such differences. In particular, a differently switched illumination source can be utilized and changes in color or polarization subsequently detected. According to a further example, an overview image can be captured with an illumination from above and sample receptacles are segmented in the overview image. An overview image is also captured with an illumination from below and again the sample receptacles are segmented. Any difference between the segmentation masks can now be determined. In the case of filled wells/sample receptacles, the sample receptacle should be visible in actual size when illuminated from below while the sample receptacle should appear smaller when illuminated from above.

The evaluation program can also infer a fill level or whether there is any sample fluid at all in a corresponding sample receptacle as a function of visible/detected drops or condensate in the sample image area. If drops are visible, this is an indicator that a sample fluid is present. In the case of a closed sample receptacle, it is possible to infer that a fill level has sunk from an original fill level from drops or condensate on a sample receptacle cover, e.g. due to evaporation.

The evaluation program can also be designed to detect fluid surfaces and determine the fluid state accordingly. Fluid surfaces can be visible, e.g., as rings in the overview image so that a ring size is assessed.

A plurality of overview images can also be captured in succession and the evaluation program determines, as the fluid state, whether a sample has been contaminated by determining a color change in the sample image area. It is thus determined whether there is any change in color of the sample fluid in a particular sample receptacle over the overview images. The sample fluid can optionally also comprise a pH indicator. Detection of contamination can thus be improved as bacteria and yeasts change the pH value of the surrounding medium. Independently of such a contamination, if the pH indicator changes color, the evaluation program can likewise generally infer a change in the fluid state. In particular, the pH value can also be estimated as the fluid state. One reason for a pH change can be, e.g., an excessive or insufficient gassing with $CO_2$, which can result from incorrect incubator settings. In particular, if a change in the pH value is determined for the fluids of a plurality of sample receptacles, the evaluation program can also indicate a possible cause of the change in pH directly, such as an incorrect gassing.

Contextual Data

The evaluation program can be designed to additionally take into account predefined information (contextual data) when determining the fluid state, said predefined information relating to the sample, the sample carrier, a measurement situation or other device properties. The contextual data can be immediately available or selected as a function of the information to be determined from a database containing different contextual data, as described in greater detail below. The contextual data can be exploited both by an evaluation program comprising a learned evaluation model as well as by an evaluation program that functions without machine learning models.

Contextual data can in particular relate to information regarding an initial fill level (in the form of a specification of a binary value or quantity), which can be specified, for example, by a user. The contextual data can also comprise details relating to the fluid used or to the sample type used and/or details relating to the sample carrier used. This information can be entered by a user or determined automatically, in particular from the overview image. For example, the overview image can be assessed based on sample carrier characteristics—such as descriptive labels or sample receptacle diameters and spacing—in order to infer a sample carrier type from among a plurality of predefined sample carrier types. Information regarding volumes of the sample receptacles can be stored, e.g., for a plurality of sample carrier types as contextual data. In the case of a learned evaluation model, training data can have been used together with a specification of the respective sample carrier types, whereby the learned model is able to take into account the contextual data of the sample carrier type in the assessment of sample image areas. If the contextual data relates to the fluid or the sample type, it is easier to infer an evaporation or turbidity behavior while colors or color intensities can be interpreted more precisely.

Contextual data can additionally or alternatively relate to information regarding a type of an experiment being conducted, which can be input by a user or determined automatically. This information can allow the evaluation program to derive, for example, whether the sample image areas of fluids of different sample receptacles should appear the same or different in the overview image. The experiment can also indicate whether changes in the sample over time are intentional or indicate an error.

Determining the Sample Image Areas

In principle, one or more sample image areas representing a sample fluid or sample receptacles of a sample carrier can be determined in any manner from the at least one overview image.

In a simple case, e.g., an arrangement of a special sample carrier on the sample stage can be predetermined by a receiving frame or stop. If the sample carrier type and the position of the sample stage are known, it can be deduced therefrom where one or more sample image areas should be located in the overview image. An assessment of an overview image is not necessary to define sample image areas in this case.

Alternatively, the overview image, an image derived from the same or at least one further overview image can be assessed using image analysis methods in order to determine the sample image areas. In principle, this can occur via a classic image processing algorithm, without learned models. For a robust detection of a plurality of different sample receptacles or sample types, however, it can be preferable to provide a learned model for finding the sample image areas of sample fluids or sample receptacles. The computing device can accordingly comprise a model (localization model) learned using training data for determining sample image areas in overview images. All sample image areas determined by the localization model can be entered into the evaluation program. For example, the localization model can perform a semantic segmentation or a detection by means of a trained CNN in order to specify an image section (i.e. a sample image area) for each sample receptacle. This CNN is learned using a training data set consisting of images and an associated annotation (image coordinates or segmentation mask). The annotations can be provided, e.g., manually by an expert.

Actions in View of the Determined Fluid State

A determined fluid state can be utilized to set basic parameters before a planned experiment is conducted with the microscopy system. The determined fluid state can also serve to control parameters while the experiment is being conducted.

The determined fluid state can be used, for example, to automatically select sample receptacles for close monitoring in a next step of a planned sequence.

A warning can be output, in particular to a user, if the determined fluid state does not correspond to a predefined target state or if it is detected that sample receptacles are present for which a fluid state cannot be determined by the evaluation program. A warning can in particular be output in the event that a fill level cannot be determined for certain sample receptacles, in the event that a contamination is determined, in particular a change in the pH value via the color of a pH indicator, or in the event that a change in turbidity is determined. A warning can also be generated in the event that fill levels are in critical ranges (too low or too high) or if any change in the fill level occurs at all.

If the microscope comprises an upright microscope stand and an immersion objective, a determined fill level can also be used as part of a spillage protection system. Since an overview image is captured before the objective is immersed in a sample receptacle, a timely warning can be issued should the fill level exceed a maximum value and an immersion of the objective consequently potentially lead to spillage.

Instead of or in addition to a warning, it is also possible for parameters to be adjusted, either automatically or manually in accordance with an instruction output to the user. For example, an instruction to modify incubation conditions can be output.

Positioning Speed of a Sample Stage

A maximum positioning speed of a sample stage can also be set, alternatively or in addition to the aforementioned actions, as a function of a determined fill level. In the case of a plurality of sample receptacles with different fill levels, the maximum positioning speed can be set as a function of the highest of the determined fill levels. The positioning speed is set to be lower, the higher the fill level or the closer the fill level is to an upper edge of the associated sample receptacle. The table positioning speed can thereby be adjusted so as to realize a maximum efficiency of the optical system in safe conditions.

The overview image can also be exploited to determine a magnitude of a cross-section of a sample receptacle, whereby the maximum positioning speed is also set as a function of the determined magnitude of the cross-section. It is thereby possible to take into account that the surface tension is particularly relevant for sample receptacles with a small cross-section so that a high stage-positioning speed is possible despite a higher fill level. The magnitude of the cross-section of a sample receptacle can in particular be determined from the corresponding sample image area or from a larger part of the overview image. It is also possible to carry out a classification of the sample carrier type using the overview image. To this end, for example, the overview image or an image calculated therefrom can be input into a trained classification model, which has learned using training images of different sample carrier types to distinguish between the latter. Respective cross-sectional magnitudes of the sample receptacles can be stored for the different sample carrier types so that the magnitude of the cross-section can be determined via the classification of the sample carrier.

General Features

A microscopy system is understood to be an apparatus that comprises at least one computing device and a microscope. In principle, a microscope can be understood to be any measurement device with magnification capabilities, in particular a light microscope, an X-ray microscope, an electron microscope, a macroscope or an image-capturing device with magnification capabilities of some other design. The computing device can be designed to be an integral part of the microscope, arranged separately in the vicinity of the microscope or be arranged at a remote location at any distance from the microscope. The computing device can also be designed to be decentralized and communicate with the microscope via a data link. It can generally be formed by any combination of electronics and software and comprise in particular a computer, a server, a cloud-based computing system or one or more microprocessors or graphic processors. The computing device can also be configured to control the microscope camera, the overview camera, image capture, the sample stage drive and/or other microscope components.

In principle, the sample carrier can be any object for receiving one or more sample fluids, for example a microtiter plate, a chamber slide, a Petri dish or a Petri dish designed with a plurality of separate compartments. The sample carrier can comprise one or more sample receptacles for receiving a respective sample fluid, e.g. round wells/vessels of a microtiter plate or rectangular chambers of a chamber slide. A plurality of sample fluids can also be arranged spaced apart from one another, e.g., in the form of drops in the same receptacle, for example next to each other on the bottom of a Petri dish. A sample fluid is understood to be a fluid containing a sample to be analyzed. In the context of the present disclosure, the expressions "fluid" and "liquid" may be understood interchangeably. In particular, the sample fluid may be referred to as a sample liquid, and the fluid state may be referred to as a liquid state. The fluid can be any water-based and/or oil-based solution and/or comprise a culture medium. The sample can be any kind of sample and comprise, for example, dissolved particles or floating or deposited objects in the fluid. In particular, a sample can contain biological cells or cell parts.

The overview camera for capturing an overview image can be provided in addition to a sample camera with which images of a sample area are captured with a higher magnification. Alternatively, one and the same camera can be used, wherein different objectives or optical systems are used for the capture of an overview image and a sample image with a higher magnification. The overview camera can be mounted on a stationary device frame, e.g. a microscope stand, or on a movable component, e.g. a sample stage, focus drive or objective revolver. A color camera can be preferable for more precise image analyses. The overview image can be a raw image captured by a camera or an image processed from one or more raw images. In particular, a captured raw image/overview image can be further processed before it is assessed in the manner described in the present disclosure. It is also possible for a plurality of overview cameras to be directed at the sample carrier from different perspectives. It is thus possible to calculate an overview image based on images from the plurality of overview cameras or to enter overview images (or sample image areas from the same) from different overview cameras collectively into the evaluation program. A fill level can potentially be determined more precisely from a plurality of overview images with different camera orientations. Method variants of the invention can use overview images captured in advance—for example, the overview images might be received from a memory—or, alternatively, the capture of the overview images can be an integral part of the claimed method variants. Images described in the present disclosure, e.g. overview images, can consist of pixels or be vector graphics or be constituted as a mixture of the two. In particular segmentation masks can be vector graphics or can be converted into vector graphics.

A sample image area can be an image area of an overview image or a section calculated from a plurality of overview images in which at least part of a sample fluid is visible. A division into a plurality of sample image areas can also occur according to sample receptacles, whereby a plurality but not necessarily all of the determined sample image areas show a sample fluid.

An illumination device can optionally illuminate a sample carrier during the capture of an overview image. The illumination device can be a light source of the microscope that is also used during sample analyses involving the microscope objective and the microscope camera, e.g. a light source for analyses using incident light or transmitted light. Alternatively, it can be an additional light source that is used solely for capturing overview images and is directed, for example, at an angle onto a top or bottom side of a sample carrier. The illumination device can optionally be switchable so as to generate different illumination patterns, wherein the evaluation program assesses the illumination patterns visible through the sample fluid.

A computer program according to the invention comprises commands that cause the execution of one of the described method variants when said method variants are executed by a computer.

The learned models or machine learning models described in the present disclosure respectively denote a model learned by a learning algorithm using training data. The machine learning models can, for example, respectively comprise one or more convolutional neural networks (CNN), which receive at least an input image, in particular an overview image or an image calculated therefrom, as input. The training of the machine learning model can have been carried out by means of a supervised learning process in which training overview images with an associated annotation/labelling were provided. A learning algorithm is used to define model parameters of the machine learning model based on the annotated training overview images. A predefined objective function can be optimized to this end, e.g. a loss function can be minimized. The loss function describes deviations between the predetermined labels and current outputs of the machine learning model, which are calculated from training overview images using the current model parameter values. The model parameter values are modified to minimize the loss function, said modifications being calculated, e.g., by gradient descent and backpropagation. In the case of a CNN, the model parameters can in particular comprise entries of convolution matrices of the different layers of the CNN. Other deep neural network model architectures are also possible instead of a CNN. Instead of a supervised learning process, there can also occur an unsupervised training in which no annotations are provided for the training images. A partially supervised training or a reinforcement learning process is also possible.

The characteristics of the invention that have been described as additional apparatus features also yield, when implemented as intended, variants of the method according to the invention. Conversely, a microscopy system can also be configured to carry out the described method variants. In particular, the computing device can be configured to carry out the described method variants and/or output commands for the execution of described method steps. The computing device can also comprise the described computer program. While some variants use a trained machine learning model, other variants of the invention result from the implementation of the corresponding training steps.

BRIEF DESCRIPTION OF THE DRAWINGS

A better understanding of the invention and various other features and advantages of the present invention will become readily apparent by the following description in connection with the schematic drawings, which are shown by way of example only, and not limitation, wherein like reference numerals may refer to alike or substantially alike components.

DETAILED DESCRIPTION OF EMBODIMENTS

Different example embodiments are described in the following with reference to the figures.

FIG. 1

Figure 1:
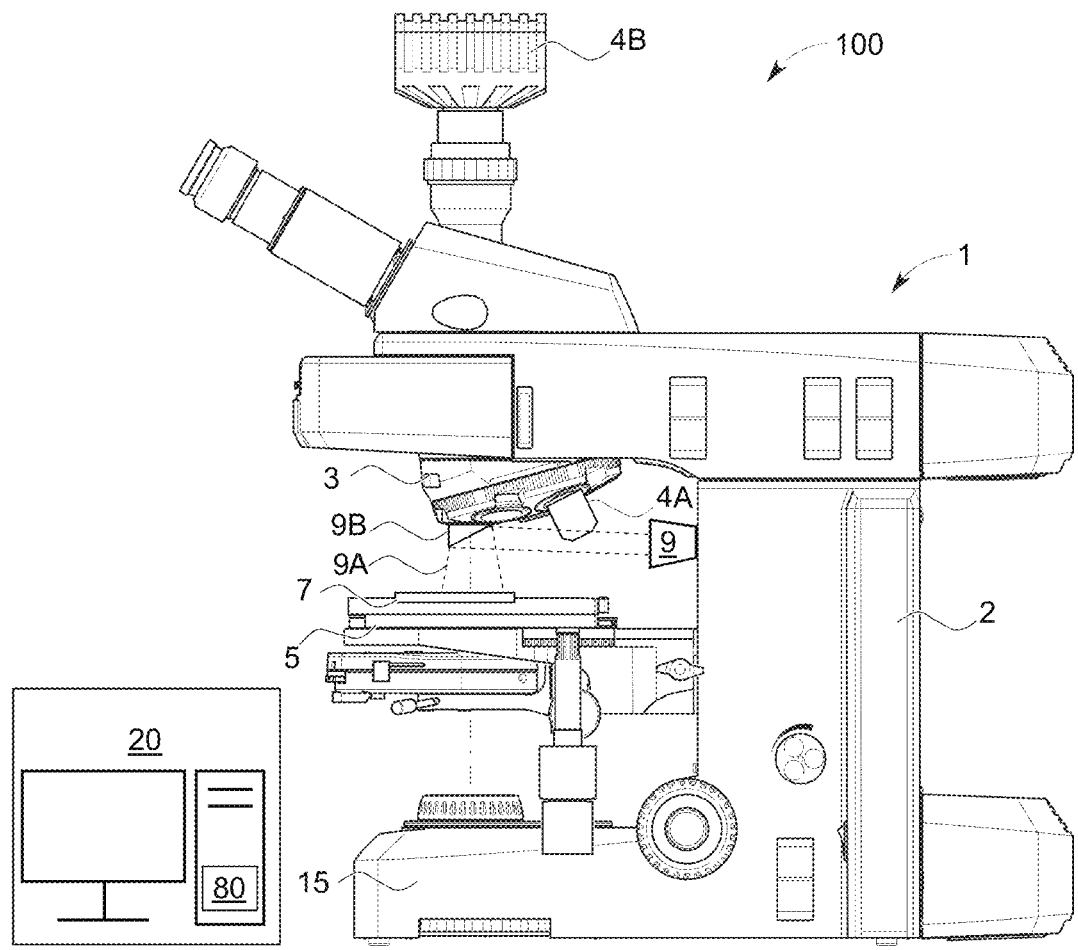
FIG. 1 is a schematic illustration of an example embodiment of a microscopy system of the invention.

FIG. 1 shows an example embodiment of a microscopy system 100 according to the invention. The microscopy system 100 comprises a computing device 20 and a microscope 1, which is a light microscope in the illustrated example, but which can be in principle any type of microscope. The microscope 1 comprises a stand 2 via which further microscope components are supported. The latter can in particular include: an illumination device 15, an objective changer/revolver 3, on which an objective 4A is mounted in the illustrated example, a sample stage 5, on which a sample carrier 7 can be positioned, and a microscope camera 4B. If the objective 4A has been rotated so as to be located in the microscope light path, the microscope camera 4B receives detection light from one or more samples supported by the sample carrier 7 in order to capture a sample image.

The microscope 1 also comprises an overview camera 9 for capturing an overview image of the sample carrier 7 or a part of the same. A field of view 9A of the overview camera 9 is larger than a field of view when a sample image is captured. In the illustrated example, the overview camera 9 views the sample carrier 7 via a mirror 9B. The mirror 9B is arranged on the objective revolver 3 and can be selected instead of the objective 4A. In variants of this embodiment, the mirror or some other deflection element can also be arranged at a different site. Alternatively, the overview camera 9 can also be arranged so as to view the sample carrier 7 directly without a mirror 9B. While the overview camera 9 views a top side of the sample carrier 7 in the illustrated example, it is alternatively possible for the overview camera 9 to be directed at a bottom side of the sample carrier 7. It is in principle also possible for the microscope camera 8 to function as an overview camera by means of the selection of a different objective, in particular a macro-objective, via the objective revolver 3 for the capture of an overview image.

The computing device 20 uses a computer program 80 according to the invention to process overview images and optionally control microscope components based on results of said processing. For example, the computing device 20 can assess an overview image so as to determine where wells of a microtiter plate are located in order to subsequently control the sample stage 5 in such a manner that a specific well can be positioned appropriately for further analysis. The example embodiments of the invention enable the extraction of still further information regarding the samples using overview images, as described in greater detail with reference to FIG. 2.

FIG. 2

Figure 2:
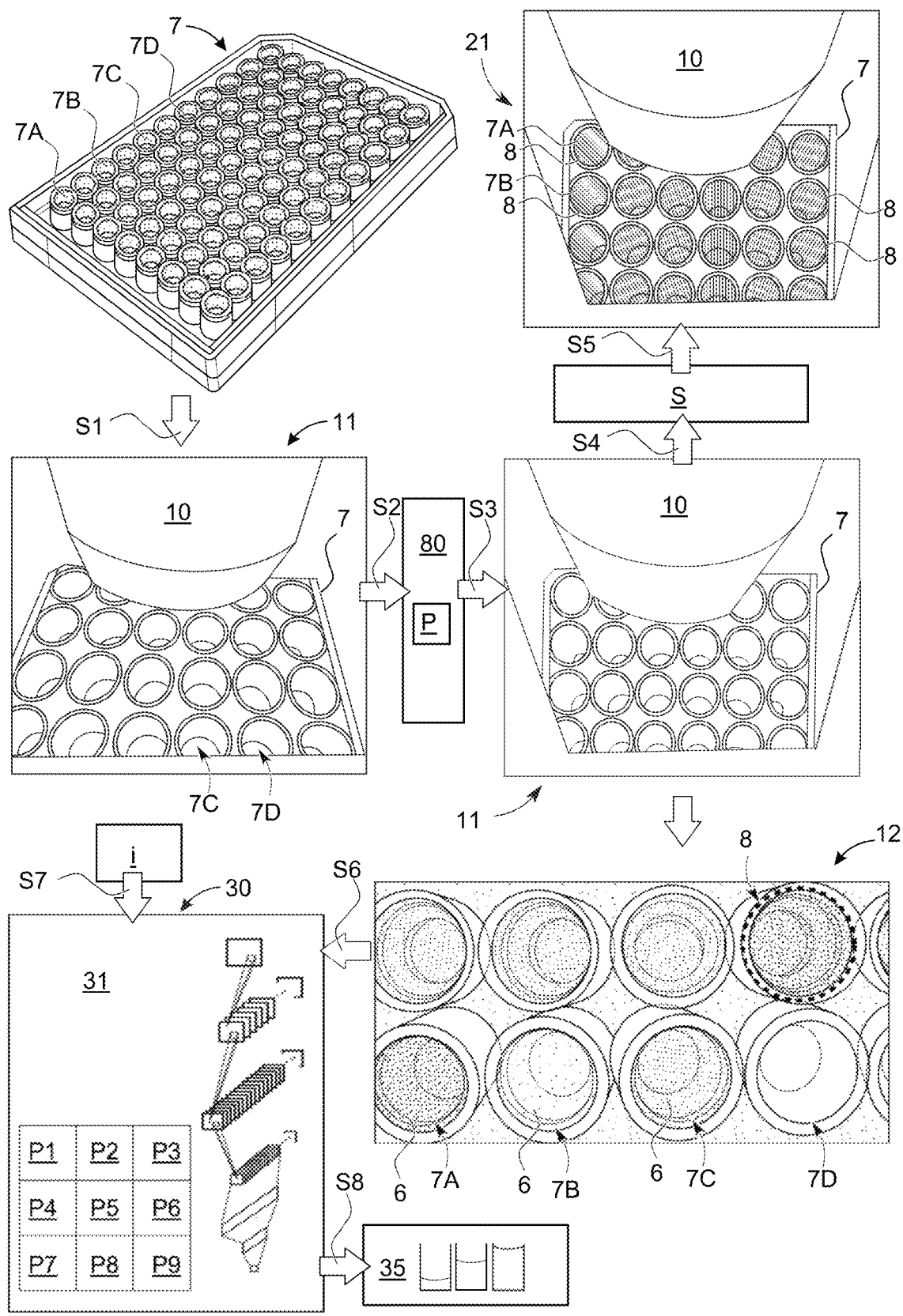
FIG. 2 is a schematic illustration of processes of an example embodiment of a method of the invention.

FIG. 2 illustrates schematically processes of an example embodiment of a method of the invention. The method can be carried out by the computer program or the computing device of FIG. 1.

FIG. 2 shows at the top left a sample carrier 7, here a microtiter plate, with a plurality of wells or sample receptacles 7A-7D. A sample can be respectively arranged in said sample receptacles 7A-7D and is typically located in a fluid. This fluid or the fluid containing a sample is called the sample fluid.

In step S1, an overview camera of a microscope captures an overview image 11. In this example, the overview camera views a top side of the sample carrier 7 at an angle, the illustrated example depicting an inverted microscope setup in which a condenser 10 is located above the sample carrier 7 and an objective, which is not visible here, is located underneath the sample carrier 7. Circular sample receptacles 7C and 7D appear oval because of the oblique view.

In step S2, the overview image 11 is input into the computer program 80, which has calibration parameters P. The latter describe a relationship between locational information from the overview image 11 and locational information relating to a microscope reference location. In particular, the calibration parameters P enable a homographic mapping of the input overview image into another plane/view. In the illustrated example, the computer program 80 calculates a plan view using the calibration parameters P and outputs the overview image 11 as a plan view in step S3. Circular sample receptacles appear precisely as circles in the plan view, which facilitates, among other things, subsequent processing steps.

In step S4, the overview image 11, which is now a plan view, is entered into a segmentation model S. The segmentation model S calculates a segmentation mask in step S5, FIG. 2 showing a combination of the segmentation mask and the overview image 11 as a superposition 21. In the segmentation mask, wells 7A, 7B are localized and distinguished from a background, i.e. from the rest of the image content. For example, the segmentation mask can be a binary mask in which one pixel value indicates that the corresponding pixel belongs to a well, while another pixel value indicates that the corresponding pixel belongs to the background.

By means of the segmentation of the wells 7A, 7B, image areas—called sample image areas 8 here—are labelled. Each sample image area 8 corresponds to one of the wells/sample receptacles 7A, 7B. The segmentation model S in this case is a learned model that was learned using annotated training data (namely overview images and predefined segmentation masks). The segmentation model can in particular be designed for instance segmentation in which not only are image areas of sample receptacles labelled as such but, in addition, a differentiation between different sample receptacles occurs. This can be relevant, for example, for an identification of directly adjacent sample receptacles with touching segmented surfaces as different sample receptacles. Alternatively, a classic segmentation algorithm may also be used. In further variants, the sample image areas 8 can be determined by, e.g., a detection model which calculates bounding boxes around the sample receptacles 7A, 7B. The bounding boxes can be rectangular or square and do not have to coincide exactly with the edges of the sample receptacles 7A, 7B visible in the overview image 11. Generally speaking, it is sufficient if each sample image area 8 depicts parts of one of the sample receptacles or an entire sample receptacle, although an area surrounding the sample receptacle may also be depicted. In order to facilitate further analysis, each sample image area 8 only shows image portions from a single well 7A, 7B, although in principle a plurality of wells can be included in the same sample image area 8 and subsequently assessed together or separated for a separate assessment.

FIG. 2 further shows schematically a part of the overview image 11 as a magnified image section 12. A plurality of sample receptacles 7A-7D are discernible, which can be respectively filled with sample fluid 6. The sample fluids 6 can differ in type or quantity. Different fill levels of the sample fluids 6 in the sample receptacles 7A-7D result in a different colour intensity or turbidity. It is shown in a purely schematic manner that the strongest colour intensity can be found in sample receptacle 7A, which has the highest fill level. The sample receptacle 7D, on the other hand, appears virtually transparent since no sample fluid 6 is received therein. For the purposes of illustration, the boundary of a sample image area 8 as determined previously via segmentation is indicated as a dashed line. The remaining determined sample image areas 8 are not indicated in the same manner for the sake of a clearer figure.

The various sample image areas 8 from the magnified image section 12 are now input (individually or collectively) into an evaluation program 30 in step S6. The evaluation program in this example is constituted as a learned evaluation model 31, which can in particular comprise a deep neural network, e.g., a CNN. It comprises model parameters the values of which have been defined using training data. For the purposes of illustration, entries of a convolutional matrix of a CNN are shown as model parameters P1-P9. Using the training data, the evaluation model 31 has learned to discriminate between different fluid states based on the sample image areas 8. In the process, the evaluation model 31 can also take into account, together with the sample image area 8, associated contextual data i, which is input in step S7. This will be explained in greater detail later on. For instance, the fluid state can be or can comprise an indication of the fill level, which can be estimated from, among other things, a colour intensity or turbidity of the sample fluid 6 visible in the sample image area 8. In step S8, the evaluation model 31 calculates a fluid state 35 such as, for example, an indication of a fill level. This can occur, for example, by means of an evaluation model 31 trained to perform a classification, which indicates, from among the possible classification results, e.g., whether the fill level is too low, as desired or too high.

With the described variant of the invention, it is possible to extract information about sample fluids in one or more sample receptacles 7A-7D from a simple overview image 11. The progression of an experiment can thus be monitored and errors detected at an early stage. If, for example, one of the sample receptacles 7A-7D is filled to a level that is too high—which would lead to spillage in the event of an immersion of an objective—this can potentially be detected before an automated in-depth analysis of all or a plurality of the sample receptacles of the microtiter plate by means of a motorized sample stage and objective begins.

A learning process of the evaluation model 31 is described in the following with reference to the following figure.

FIG. 3

Figure 3:
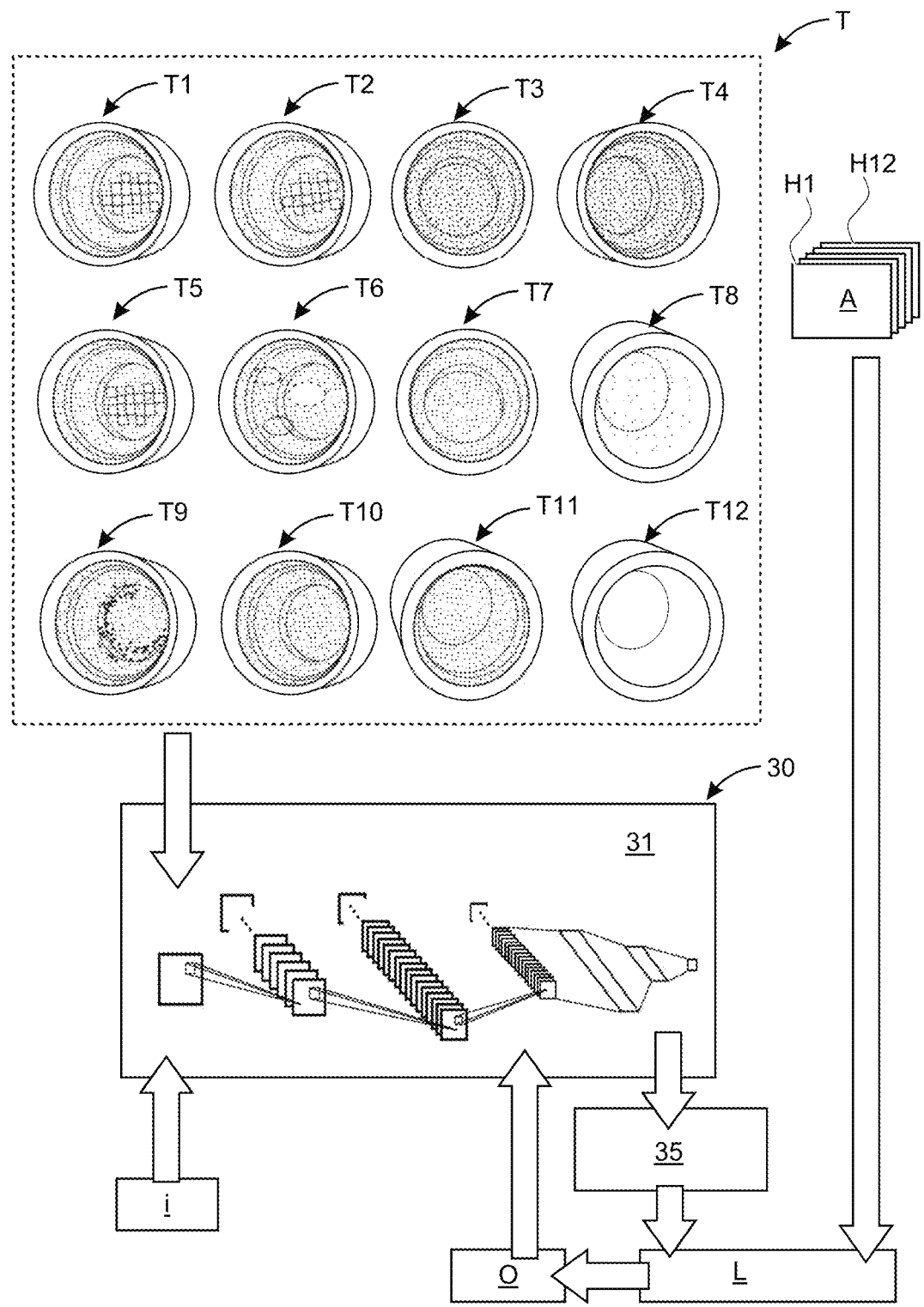
FIG. 3 illustrates a learning process of the evaluation model of the method of FIG. 2.

FIG. 3 shows schematically a learning process of the evaluation model 31 of FIG. 2 according to variant embodiments of the invention. The learning process forms part of some variants of the method, while other variants of the invention use the ready-trained model so that the steps relating to the training do not form part of those variants.

Training data T comprising a plurality of training images T1-T12 is provided. In this example, the training images T1-T12 are sample image areas that have been extracted from overview images. Each sample image area shows a sample receptacle, which can be empty or which can contain a sample fluid. The training images T1-T12 differ in particular with respect to a fluid state of the respectively depicted sample fluids. This fluid state is specified as known (ground truth) for each training image T1-T12 in the form of respective annotations A.

The fluid state can be, for example, a fill level of the sample fluid in the respective sample receptacles so that the annotations A indicate respective fill levels H1-H12. Alternatively or additionally, the annotations can also indicate, e.g., a pH value, which is particularly feasible if a pH indicator, which changes the colour of a sample fluid depending on its pH value, is added to the respective sample fluids.

The evaluation model 31 is initiated with (e.g. predetermined) start values of model parameters and the training images T1-T12 or a portion thereof (batch) are input into the evaluation model 31 for the training. Based on the initial model parameters and the input training images T1-T12, the evaluation model 31 calculates outputs 35, which are fed to a loss function L. The loss function L captures differences between the outputs 35 calculated with current model parameter values and the associated annotations A. An optimization function O minimizes the loss function L iteratively, to which end the optimization function O adjusts values of the model parameter values iteratively, e.g. by gradient descent and backpropagation.

The training process is ended when a stopping criterion has been reached, e.g. a maximum number of iterations. Outputs 35 calculated by the ready-trained evaluation model 31 now indicate a fluid state. The annotations A chosen determine which fluid states the evaluation model 31 can name. The training images T1-T12 chosen determine which/how image content is taken into account by the evaluation model 31 for the calculation of the output/fluid state 35.

For example, a background can be visible through transparent or partially transparent sample fluids. The background can in particular be an arrangement of (switchable) light sources. For instance, in the training images T1, T2 and T5, a chequered pattern caused by an LED matrix of the microscope's illumination device is visible through the sample fluid. As the training images T1, T2, T5 were captured with the same illumination device—i.e. so that a spacing between the LEDs remains constant—differences in the visible chequered patterns essentially result from an arrangement of the sample receptacles and properties of the sample fluid, in particular its fill level, transparency and/or refractive index. By using training images which depict different fill levels and which respectively comprise a visible chequered pattern generated by an illumination device of the microscope, the evaluation model 31 can learn to deduce a fill level based on this image content.

It is in particular also possible to take a lens effect into account when a background is visible through the sample liquid. A surface of the sample liquid accordingly acts as a lens that distorts the background. By using a plurality of training images which show the same background through fill levels of various heights, the evaluation model 31 can learn to use such differences, which are caused by the lens effect of the sample fluid, for the determination of the fluid state.

The training images T1-T12 can also show sample fluids with different levels of turbidity and/or colour intensity. At higher fill levels, a turbidity or colour intensity generally appears higher, as illustrated in the training image T4, as opposed to the training image T8, which was captured at a low fill level. By means of such training images, the evaluation model 31 can additionally or alternatively learn to use corresponding image content (different turbidity levels and/or colour intensities) for the determination of a fill level or another fluid state specified by the annotations A.

Furthermore, some of the training images T1-T12 can also show sample receptacles in which condensate water or droplets have collected on a sample receptacle wall or on a transparent cover, as indicated purely schematically in the training image T6. In principle, droplets or condensate can be detected by their shape and by the fact that a background viewed through them appears blurred. By using training images that partially show droplets or different degrees of droplet formation, together with the respectively associated annotations A, the evaluation model 31 can learn to assess this image content for the determination of the fluid state 35.

Contaminations in the form of deposits at, e.g., edges, which can arise due to the growth of microorganisms in the sample fluid, can be determined based on the brightness or colour gradients within a sample image area. In the training image T9, undesirable deposits are discernible at the rim of the sample receptacle. In this scenario, a plurality of training images with contaminations and further training images without contaminations can be used together with corresponding annotations regarding the presence or absence of a contamination. The evaluation model thus learns to detect contaminations based on this image content and to indicate it as a fluid state 35.

Optionally, some or all of the training images T1-T12 can also be provided with contextual data i. The latter is also input into the evaluation model 31 in the training so that the evaluation model 31 learns to take contextual data i into account when determining the fluid state 35. The contextual data i can be, e.g., information regarding the sample or the fluid solution in which the sample is located, e.g. a buffer solution. If, for example, different solutions have different colours or colour intensities, the evaluation model 31 can learn to distinguish between two cases involving a similar colour intensity, one showing a colour-intensive fluid at a low fill level and the other a less colour-intensive fluid at a higher fill level, by means of the contextual data.

The contextual data i can also indicate the use of a specific pH indicator. Depending on the pH indicator, colours and pH limit values of a colour change are different. If the training images and associated contextual data cover one or more different pH indicators, the evaluation model can learn to correctly interpret the colours or pH values signalled by these pH indicators in an overview image.

A sample carrier type can be indicated as further contextual data i. The sample carrier type defines dimensions of the sample receptacles and thus also expected fill levels. The sample carrier type can be determined from an overview image using an additional learned classification model so that the determined sample carrier type can subsequently be exploited as contextual data in the evaluation model 35.

FIG. 3 illustrates a supervised learning process. In other variants, an unsupervised learning process without specified annotations A can be implemented. For example, the evaluation model 31 can be trained for anomaly detection by means of an unsupervised learning. All training images used can correspond to a fill level in an acceptable range (or to an acceptable fluid state, without contaminations and without excessive condensation or droplet formation). If the ready-trained evaluation model receives a sample image area that deviates from the distribution of training images used, an anomaly is detected, which is interpreted as an unacceptable fill level/fluid state.

A mapping of image data (image section of a well) to desired outputs (fill level or other fluid state) is calculated by means of the learned evaluation model 31 using characteristic features. The characteristic features are learned directly from the training images and do not have to be modelled explicitly for each use case.

For the purposes of illustration, a learning process in which training images T1-T12 are processed individually has been described with reference to FIG. 3. It is, however, also possible to assess a plurality of training images of the same sample receptacle that have been captured in succession. It is thereby possible to take into account a progression over time. For example, a time until evaporation of the sample fluid can be estimated as the fluid state, in particular a time until a predetermined portion of the sample fluid has evaporated or a fill level has sunk below a minimum fill level due to evaporation.

FIG. 4

Figure 4:
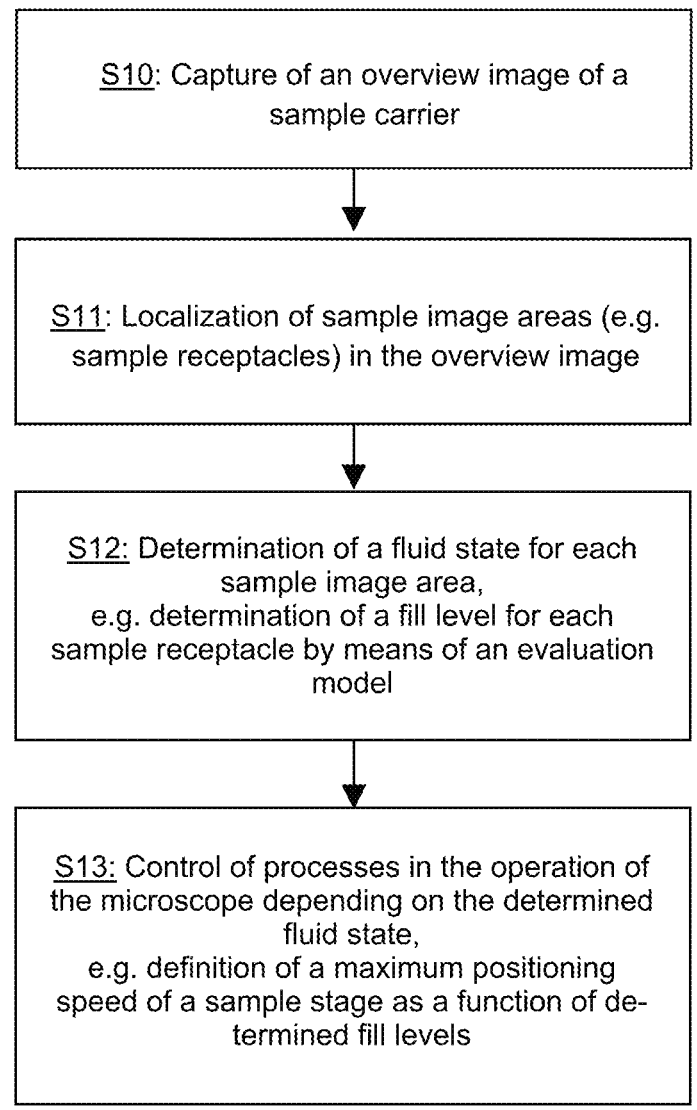
FIG. 4 is a flowchart of a further example embodiment of a method of the invention.

FIG. 4 shows a flowchart of variant embodiments of the method of the invention.

In step S10, at least one overview image of a sample carrier is captured using an overview camera.

In step S11, sample image areas, e.g. the image areas of sample receptacles, are localized in the overview image.

In step S12, an evaluation model is used to determine a fluid state for each sample image area. For example, a fill level can be determined for each sample receptacle.

In step S13, processes in the operation of the microscope are controlled depending on the at least one detected fluid state. For example, a maximum positioning speed of a sample stage can be set depending on one or more determined fill levels. A table or model can be stored for this purpose, which determines how a maximum allowable positioning speed or acceleration is derived from determined fill levels. In particular, the maximum allowable positioning speed or acceleration can be defined as a function of the highest fill level from among a plurality of determined fill levels. In one variant, the evaluation model is directly trained to calculate a control of the processes in the operation of the microscope as a function of the fluid state. In this case, steps S12 and S13 can occur together. Analogously, steps S11 and S12 can also be carried out together by an evaluation model if the evaluation model described in the foregoing and a preceding model for determining the sample image areas are combined into a single model.

The described example embodiments are purely illustrative and variants of the same are possible within the scope of the attached claims. While the figures show examples relating to microtiter plates, other sample carriers with one or more sample receptacles can also be used. The sample fluid does not have to wet the side walls of a sample receptacle, but can also be present as drops on a bottom of the sample receptacle or sample carrier. Further calculation steps can be added between the described calculation steps. For example, an overview image can be cropped, converted to greyscale or processed in a more complex manner, e.g. by a model trained to denoise or calculate a high-resolution image, before or after one of the described steps. The described calculation of a plan view can be omitted as an optional step or used solely for the localization of the sample image areas, but not for the image data entered into the evaluation program.

LIST OF REFERENCE SIGNS

1 Microscope
2 Stand
3 Objective revolver
4A Microscope objective
4B Microscope camera
5 Sample stage
6 Sample fluid
7 Sample carrier
7A-7D Sample receptacles of the sample carrier 7
8 Sample image area from an overview image
9 Overview camera
9A Field of view of the overview camera
9B Mirror
10 Condenser
11 Overview image
12 Image section from the overview image 11
15 Illumination device
20 Computing device
21 Superposition of segmentation mask and overview image
30 Evaluation program
31 Evaluation model
35 Fluid state/output from the evaluation program 30
80 Computer program of the invention
100 Microscopy system of the invention
A Annotations
H1-H12 Annotations indicating fill levels/fluid states
i Contextual data
L Loss function
O Optimization function
P Calibration parameters
P1-P9 Model parameters of the evaluation model 31
T Training data
T1-T12 Training images
S Segmentation model/localization model
S1-S8 Method steps of example embodiments of the invention
S10-S13 Method steps of example embodiments of the invention

We claim:

1. A microscopy system comprising
a microscope with an overview camera for capturing at least one overview image of a sample carrier comprising at least one sample receptacle for receiving at least one sample fluid; and
a computing device configured to determine at least one sample image area of the at least one sample fluid within the at least one overview image;
wherein the computing device comprises an evaluation program into which each determined sample image area is entered and which is configured to determine a fill level of the sample fluid based on the sample image area;
wherein a maximum positioning speed of the sample stage is set as a function of the determined fill level in the at least one sample receptacle, wherein, in the case of sample receptacles with different fill levels, the maximum positioning speed is set as a function of a highest of the different fill levels.

2. The microscopy system of claim 1,
wherein a magnitude of a cross-section of the at least one sample receptacle is determined from the overview image and wherein the maximum positioning speed is also set as a function of the determined magnitude of the cross-section.

3. A computer-implemented method for evaluating overview images, comprising an overview camera of a microscope capturing at least one overview image of a sample carrier designed to receive at least one sample fluid;

a computing device determining at least one sample image area of the at least one sample fluid within the at least one overview image; and entering each determined sample image area into an evaluation program, wherein the evaluation program determines a fluid state of the sample fluid based on the sample image area;

wherein the microscope comprises an upright microscope stand and an immersion objective, wherein the evaluation program determines a fill level of at least one sample receptacle of the sample carrier as the fluid state, and wherein a warning is output for the purposes of preventing potential spillage due to an immersion of the objective in the sample receptacle or due to a sample stage movement when the fill level exceeds a maximum value.

4. The method according to claim 3, wherein the sample carrier comprises a plurality of sample receptacles for receiving a respective sample fluid;

wherein a plurality of sample image areas depicting the sample receptacles are determined within the same overview image;

wherein a fluid state of the sample fluid is respectively determined for each of the sample image areas.

5. The method according to claim 3, wherein the evaluation program comprises an evaluation model learned using training data, wherein the training data comprises annotated training images, which are overview images or sample image areas of overview images for which a fluid state is respectively specified in the form of an annotation.

6. The method according to claim 5, wherein the determined fluid state indicates a fill level relating to the associated sample fluid; and wherein the training data of the evaluation model shows sample receptacles filled to different levels and fill levels are respectively indicated in the form of annotations.

7. The method according to claim 3, wherein the evaluation program comprises an evaluation model for anomaly detection learned by means of unsupervised learning using training data;

wherein the evaluation model infers an anomalous fluid state as a function of a similarity of the input sample image area with the training data.

8. The method according to claim 3, wherein a plurality of overview images are captured after time intervals; wherein the at least one sample image area of the at least one sample fluid is respectively determined in these overview images; and wherein a progression of the fill level or of another fluid state over time is determined by means of the evaluation program, or wherein a prediction regarding when a fill level will fall below a minimum fill level is calculated by means of the evaluation program.

9. The method according to claim 3, wherein a plurality of overview images are captured by differently positioned overview cameras or a plurality of overview images are captured between movements of the sample stage, wherein a sample image area relating to the sample fluid is respectively determined in the plurality of overview images, and wherein the plurality of sample image areas relating to the sample fluid from different overview images are collectively fed to the evaluation program in order to determine the fluid state.

10. The method according to claim 3, wherein the evaluation program for determining the fluid state takes into account at least one of the following features:

a colour intensity in the sample image area;

how image content in the sample image area appears distorted or altered in size or position due to a lens effect caused by a fluid surface of the sample fluid;

whether drops are discernible on a side wall or cover of an associated sample receptacle in the sample image area;

whether a colour or colour distribution within the sample image area deviates from an expected sample colour or sample colour distribution, based on which a contamination of the sample can be inferred;

whether there are crystals in the sample image area, which the evaluation program uses as an indicator of a desiccation of the sample fluid;

fluid surfaces or reflections on a fluid surface in the sample image area;

a lens effect of a surface of the sample fluid, wherein the evaluation program assesses a sample image area on the basis of how distorted or altered in size a background visible through the sample fluid appears or how large a sample receptacle visible through the sample fluid appears.

11. The method according to claim 3, wherein each of the at least one sample image area shows a sample receptacle, wherein the evaluation program infers a fill level or whether there is any sample fluid at all in the sample receptacle as a function of detected drops or condensate in the sample image area which shows the sample receptacle.

12. The method according to claim 3, wherein a plurality of overview images are captured with different lighting and a difference between corresponding sample image areas in the plurality of overview images is assessed by the evaluation program in order to determine the fluid state.

13. The method according to claim 3, wherein a plurality of overview images are captured in succession and the evaluation program determines, via a colour change in the sample image area, a contamination as the fluid state.

14. The method according to claim 3, wherein a localization model learned using training data determines the at least one sample image area in the overview image;

wherein all sample image areas determined by the localization model are entered into the evaluation program.

15. The method according to claim 3, wherein the sample carrier comprises sample receptacles for receiving the at least one sample fluid;

wherein a determination is made regarding which of the sample receptacles are positioned for and subjected to further analysis as a function of the determined fluid state.

16. The method according to claim 3, wherein the sample carrier comprises at least one sample receptacle for receiving the at least one sample fluid, wherein a maximum positioning speed of the sample stage is set as a function of a determined fill level in the at least one sample receptacle, wherein, in the case of sample receptacles with different fill levels, the maximum positioning speed is set as a function of a highest of the different fill levels, and wherein a magnitude of a cross-section of the at least one sample receptacle is determined from the overview image and wherein the maximum positioning speed is also set as a function of the determined magnitude of the cross-section.

17. A non-transitory computer-readable medium comprising a program with commands that, when executed by a computer, cause the execution of the method as defined in claim 3.

18. The method according to claim 3, wherein the computing device is configured to instruct a movement of a sample stage carrying the sample carrier while capturing overview images, in which the at least one sample image area is respectively determined, and wherein the evaluation program is configured to:
 determine the fluid state from changes in appearance or lens effects between the sample image areas of the overview images, the changes in appearance or lens effects being caused by the movement of the sample stage; or
 determine the fluid state from a movement of the sample within the sample carrier or an inertia of the sample in surrounding fluid caused by the movement of the sample stage.

19. A computer-implemented method for evaluating overview images, comprising:

capturing at least one overview image of a sample carrier having at least one sample receptacle configured for receiving at least one sample fluid;

determining at least one sample image area of the at least one sample fluid within the at least one overview image; and determining a respective sample receptacle fill level of the at least one sample fluid from each determined sample image area, using an evaluation model learned from training data, wherein the training data comprises annotated training images which show sample receptacles filled with sample fluid to different levels and for which sample receptacle fill levels are respectively specified as annotations; and outputting a warning for the purposes of preventing potential spillage when the determined sample receptacle fill level exceeds a maximum value.

20. A non-transitory computer-readable medium comprising a program with commands that, when executed by a computer, cause the execution of the method as defined in claim 19.

* * * * *